(12) United States Patent
Van Riel

(10) Patent No.: US 10,711,129 B2
(45) Date of Patent: Jul. 14, 2020

(54) STYRENIC COMPOSITION CONTAINING LONG FIBERS

(71) Applicant: TRINSEO EUROPE GMBH, Horgen (CH)

(72) Inventor: Norwin Van Riel, Aardenburg (NL)

(73) Assignee: TRINSEO EUROPE GMBH, Horgen (CH)

( * ) Notice: Subject to any disclaimer, the term of this patent is extended or adjusted under 35 U.S.C. 154(b) by 117 days.

(21) Appl. No.: 15/119,006

(22) PCT Filed: Mar. 3, 2014

(86) PCT No.: PCT/IB2014/059405
§ 371 (c)(1),
(2) Date: Aug. 15, 2016

(87) PCT Pub. No.: WO2015/132628
PCT Pub. Date: Sep. 11, 2015

(65) Prior Publication Data
US 2016/0376433 A1 Dec. 29, 2016

(51) Int. Cl.
| C08L 55/02 | (2006.01) |
| C08L 77/02 | (2006.01) |
| C08K 7/14  | (2006.01) |
| C08L 25/12 | (2006.01) |

(52) U.S. Cl.
CPC .............. C08L 55/02 (2013.01); C08K 7/14 (2013.01); C08L 77/02 (2013.01); C08L 25/12 (2013.01); C08L 2201/08 (2013.01); C08L 2205/03 (2013.01); C08L 2205/035 (2013.01); C08L 2205/06 (2013.01); C08L 2205/08 (2013.01); C08L 2205/16 (2013.01)

(58) Field of Classification Search
CPC .......... C08L 55/02; C08L 77/02; C08L 25/12; C08L 2205/16; C08L 2201/08; C08L 2205/03; C08L 2205/035; C08L 2205/06; C08L 2205/08; C08K 7/14
See application file for complete search history.

(56) References Cited

U.S. PATENT DOCUMENTS

| 3,621,092 | A | * | 11/1971 | Hofer | B29C 43/02 |
| | | | | | 264/120 |
| 4,614,767 | A | * | 9/1986 | Dean | C08G 63/6886 |
| | | | | | 264/331.11 |
| 6,319,986 | B1 | * | 11/2001 | Amimoto | C08L 77/00 |
| | | | | | 428/35.7 |
| 7,135,520 | B2 | | 11/2006 | Chang et al. | |
| 8,030,393 | B2 | | 10/2011 | Niebner et al. | |
| 2003/0078348 | A1 | * | 4/2003 | Rajagopalan | A63B 37/0003 |
| | | | | | 525/425 |
| 2004/0063824 | A1 | * | 4/2004 | Takagi | C08K 5/523 |
| | | | | | 524/115 |
| 2007/0117909 | A1 | * | 5/2007 | Seliskar | C08J 3/226 |
| | | | | | 524/494 |
| 2012/0316261 | A1 | * | 12/2012 | Bradley | C08L 77/02 |
| | | | | | 523/219 |
| 2014/0323628 | A1 | * | 10/2014 | Jeol | C08K 5/17 |
| | | | | | 524/249 |
| 2016/0355678 | A1 | * | 12/2016 | Murakami | C08L 69/00 |

FOREIGN PATENT DOCUMENTS

| CN | 101245171 A | 8/2008 |
| CN | 101245185 A | 8/2008 |
| JP | H03-045640 A | 2/1991 |
| JP | 2005336268 A | 12/2005 |
| JP | 2007291161 A | 11/2007 |
| JP | 2010043204 A | 2/2010 |
| JP | 2011080029 A | 4/2011 |
| WO | 2005/090451 A1 | 9/2005 |
| WO | 2008/119678 A1 | 10/2008 |
| WO | 2001/023541 A1 | 3/2011 |
| WO | 2015/132628 A1 | 9/2015 |

OTHER PUBLICATIONS

English language translation of CN 101245185, pp. 1-8, Mar. 19, 2018.*
General ABS POLYLAC PA-747, p. 1, Chi Mei Corporation, Jan. 6, 2017.*
Sheirs et al "Modern Styrenic Polymers: Polystyrenes and Styrenic Copolymers", Wiley Series in Polymer Science, John Wiley & Sons, Ltd, Chichesters, England, p. 322 (2003).*
English language translation of JP 2010043204, pp. 1-5, Jul. 10, 2019.*
SANTAC AT-05, Nipon A&L Inc, pp. 1-2.*
SANTAC UT-61 Technical DataSheet, pp. 1-2, Jul. 5, 2019.*
General ABS POLYAC Characteristics, PA-747, Chi Mei Corporation, May 2, 2013.
High Flow ABS POLYAC Characteristics, PA-746, Chi Mei Corporation, Nov. 2, 2014.
International Preliminary Report on Patentability from the European Patent Office for Application No. PCT/IB2014/059405, dated May 18, 2016.
Written Opinion from the European Patent Office for Application No. PCT/IB2014/059405, dated Feb. 10, 2016.
International Search Report and Written Opinion from the European Patent Office for Application No. PCT/IB2014/059405, dated Nov. 26, 2014.

(Continued)

*Primary Examiner* — Alexander C Kollias
(74) *Attorney, Agent, or Firm* — Young Basile Hanlon & MacFarlane, P.C.

(57) ABSTRACT

Compositions comprising long fibers dispersed in a thermoplastic polymer matrix containing one or more styrenic polymers, moldable compositions derived from the compositions and molded products prepared based on such compositions. Also disclosed are methods of preparing the long fibers dispersed in a thermoplastic polymer matrix containing one or more styrenic polymers, along with moldable compositions and molded products thereof.

20 Claims, No Drawings

(56) References Cited

OTHER PUBLICATIONS

Basic properties table of ABS Resins, searched on the Internet on Dec. 13, 2017, URL: <http://www.nal.co.jp/abs/abs_pdf/abs_busseihyou05.pdf>.
Office Action in corresponding Chinese Patent Application No. 2016-555601, dated Jan. 8, 2019.

* cited by examiner

STYRENIC COMPOSITION CONTAINING LONG FIBERS

FIELD OF THE INVENTION

The present invention relates to compositions comprising long fibers dispersed in a thermoplastic polymer matrix containing one or more styrenic polymers, moldable compositions derived from the compositions and molded products prepared based on such compositions. The present invention also relates to methods of preparing the long fibers dispersed in a thermoplastic polymer matrix containing one or more styrenic polymers, moldable compositions and molded products.

BACKGROUND OF THE INVENTION

Thermoplastic polymers are utilized to prepare molded parts in a variety of industries, for example automotive, toys, appliances, farm and lawn tractors and implements, medical devices, food service items, electronic equipment components, and the like. Thermoplastic polymers provide significant advantages for molded products, for example lighter weight than some alternative materials, design flexibility, controlled conductivity, and the like. In some applications thermoplastic polymers present challenges, for example higher coefficient of liner expansion (CLTE), lower modulus, lower conductivity and higher brittleness than alternative materials. Fillers, such as fibers, can be added to improve CLTE, modulus and based on the nature and content of the fibers, conductivity. The backbone of thermoplastic polymers can be modified to add elastomeric nature or elastomeric polymers can be blended with base thermoplastic polymers to reduce the brittleness of molded parts derived from thermoplastic materials. Thermoplastic polymer systems containing styrenic polymers modified with elastomeric monomers or blended with elastomeric polymers are recognized as providing very good properties, such as heat stability, relatively high modulus and good modulus at elevated temperatures. Molded parts prepared from many thermoplastic polymer systems require relatively thick cross-sections (for example thick walls) to provide the strength and stiffness required for the desired application. One advantage of parts molded from thermoplastic systems is that surfaces of the molded products can be modified to match functional or aesthetic requirements, surface modified parts can be relatively glossy using some polymer systems and processing techniques. For some applications low gloss is desired. This can present an additional challenge to a parts manufacturer. Polymer systems based on styrenic polymers, especially those modified to add elastomeric properties, have improved stiffness, modulus and modulus at elevated temperatures thereby allowing the use of thinner cross-sections to reach the desired properties.

Thermoplastic polymers systems containing styrenic polymers have been modified with fibers as disclosed, in for example, WO 2011/023541; WO 2005/090451; U.S. Pat. Nos. 8,030,393 and 7,135,520 incorporated herein by reference in their entirety. Such systems have not achieved commercial success due to problems with pellet robustness, for example poor adhesion of the polymer matrix to the fibers, and poor flow properties making processing of such materials a challenge. Thus despite the desirable properties of styrenic polymer systems, fiber modified systems have not provided all of the desired properties and been processable.

Thus, what is needed is thermoplastic concentrates containing styrenic polymers and fibers which exhibit improved pellet robustness and flow properties, moldable compositions based on thermoplastic concentrates containing styrenic polymers and fibers having low water absorbtion, good retention of modulus at elevated temperatures. It is further desired that such moldable compositions facilitate the preparation of molded parts with thinner cross-sections required to meet use strength requirements and which provides low gloss on grained surfaces. What is needed is a concentrate of fibers in a thermoplastic polymer system containing styrenic polymers and moldable compositions derived therefrom having an improved balance of properties, such as high stiffness, good practical ductility, high heat performance and good processability. What are also needed are methods for preparing such concentrates, moldable compositions and molded parts derived therefrom which are commercially viable.

SUMMARY OF THE INVENTION

The present invention relates to compositions comprising: about 30 to about 80 percent by weight of the composition of long fibers dispersed in about 20 to about 70 percent by weight of the composition of a polymeric matrix comprising about 10 to about 50 percent by weight based on the polymer matrix of one or more styrenic copolymers containing one or more unsaturated nitrile compound derived monomer units and one or more elastomeric monomer units and about 30 to about 90 percent by weight of one or more polyamides wherein the styrenic copolymers exhibit a melt flow rate of about 6 or greater. In some preferred embodiments, the polymeric matrix further comprises one or more components which compatibilizes styrenic copolymers and polyamides present in an amount of about 0.1 percent by weight or greater of the polymer matrix. Preferred long fibers comprise glass or carbon fibers. Preferably, the long fibers have a length of about 3 to about 30 mm. Preferably, the fibers are derived from a woven mat or a fiber bundle. These compositions are useful for introducing the long fibers into base polymer systems wherein the base polymer systems are moldable compositions that can be utilized to prepare molded structures for a wide variety of uses. The compositions of long fibers in polymer matrices are commonly referred to as concentrates, that is concentrates of long fibers in the polymer matrices. The base polymer systems can be referred to dilution polymers because contacting of the base polymers with the compositions of long fibers in polymer matrices results in compositions having lower concentrations of long fibers than contained in the concentrate described.

The invention also relates to a moldable composition comprising a dilution polymer composition comprising one or more thermoplastic polymers having a melt flow rate of 5 or greater and the composition comprising long fibers and a polymeric matrix as described hereinbefore. The one or more thermoplastic polymers may comprise one or more polyesters, polycarbonates, polyamides, styrenic based polymers or a blend thereof. Preferably the dilution polymer contains one or more styrenic based polymers or a blend of one or more styrenic based polymers with other thermoplastic polymers, such as those disclosed herein. Preferably, the moldable composition contains about 5 percent or less of elastomeric (rubber) components. Preferably, the moldable composition contains about 1 percent or less of compounds which compatibilizes thermoplastic polymers including styrenic based polymers with polyamides. The invention further relates to molded articles derived from these compositions.

In another embodiment, the invention is a method comprising contacting a fiber mat or bundle of fibers with a mixture comprising a polymeric matrix comprising about 10 to about 50 percent by weight based on the polymer matrix of one or more styrenic copolymers containing one or more unsaturated nitrite compound derived monomer units and one or more elastomeric monomer units and about 20 to about 90 percent by weight of one or more polyamides, wherein the styrenic copolymers exhibit a melt flow rate of about 6 or greater under conditions such that the fiber mat or bundle of fibers is surrounded by the polymer matrix. In some embodiments the method may further comprise cutting the fiber mat or bundle of fibers having the polymer matrix surrounding the fiber mat or bundle of fibers to a length of about 3 to about 30 mm. In some embodiments, the components of the polymer matrix are blended prior to contacting the polymer matrix with the fiber mat or bundle of fibers.

The concentrates of fibers dispersed in polymer matrices of the invention provide improved pellet robustness and flow properties, moldable compositions based on the concentrates of long fibers in polymer matrices exhibit low water absorbtion, good retention of modulus at elevated temperatures, and facilitates the preparation of molded parts with thinner cross-sections required to meet use strength requirements and which can provide low gloss on grained surfaces. The concentrates and moldable compositions derived therefrom provide an improved balance of properties, such as high stiffness, good practical ductility, high heat performance and good processability. The methods for preparing such concentrates, moldable compositions and molded parts derived therefrom are commercially viable. The concentrates and moldable compositions can be utilized in a variety of industries, for example automotive, toys, appliances, farm and lawn tractors and implements, medical devices, food service items, electronic devices, and the like. Examples of parts that may be fabricated from the moldable compositions include automobile lift-gates, instrument panel carriers, front end carriers, door modulus, seat backs, seat pans, radiator fans, interior trim, cases or housings for electronic devices, and the like.

DETAILED DESCRIPTION

The explanations and illustrations presented herein are intended to acquaint others skilled in the art with the invention, its principles, and its practical application. Accordingly, the specific embodiments of the present invention as set forth are not intended as being exhaustive or limiting of the invention. The scope of the invention should be determined with reference to the appended claims, along with the full scope of equivalents to which such claims are entitled. The disclosures of all articles and references, including patent applications and publications, are incorporated by reference for all purposes. Other combinations are also possible as will be gleaned from the following claims, which are hereby incorporated by reference into this written description.

The invention relates to concentrates of fibers in thermoplastic polymer systems containing styrenic polymers or copolymers. Preferably the styrenic polymers or copolymers further comprise an elastomeric component. The elastomeric component can comprise elastomeric co-monomers in the backbone of styrenic copolymers or an elastomeric polymer compatible with and blended with styrenic polymers or copolymers. Often the elastomeric component is referred to as a rubber based on its properties. The thermoplastic polymer systems can comprise styrenic polymers or copolymers and elastomeric components. Additionally the thermoplastic systems can comprise other thermoplastic polymers.

Styrenic polymers generally relate to polymers or copolymers containing alkenyl aromatic compounds which are polymerized. The alkenyl groups are covalently bonded to an aromatic ring in a manner such that the compounds are polymerizable, preferably by free radical polymerization. The compounds may contain one or more aromatic rings, preferably one or two aromatic rings and more preferably one aromatic ring. The aromatic rings can be unsubstituted or substituted with a substituent that does not interfere with polymerization of the styrenic polymers, preparation of concentrates of the invention or the molding of the moldable compositions into desired structures. Preferably the substituents are halogens or alkyl groups, more preferably bromine, chlorine or $C_{1\ to\ 4}$ alkyl groups and most preferably a methyl group. Alkenyl groups comprise straight or branched carbon chains having one or more double bonds, preferably one double bond. The alkenyl groups useful for the styrenic polymers include those that when bonded to an aromatic ring are capable of polymerization to form styrenic polymers or copolymers. Preferably alkenyl groups have 2 to 10 carbon atoms and preferably 2 to 4 carbon atoms and most preferably 2 carbon atoms. Preferred styrenic monomers include styrene, alpha methyl styrene, divinyl benzene, n-phenyl-maleimide and chlorinated styrenes, more preferable styrenic monomers include alpha-methyl styrene and styrene. Styrenic copolymers may contain elastomeric comonomers to introduce elastomeric properties into the resulting thermoplastic compositions. Any copolymers that may copolymerize with styrenic monomers and which introduce some elastomeric nature into the copolymers may be utilized. Examples of types of elastomeric comonomers include alkadienes, especially conjugated alkadienes thereof. Preferred elastomeric monomers include especially conjugated alkadienes (such as butadiene and isoprene). Most preferred is butadiene. The styrenic copolymers may further comprise co-monomers that polymerize with the unsaturated groups on styrenic monomers. Preferred monomers co-polymerizable with styrenic monomers include acrylates, methacrylates, acrylonitriles, methacrylonitriles and mixtures thereof, with acrylonitrile most preferred. Preferred styrenic copolymers include styrene alkadiene copolymers, styrene acrylonitrile (SAN) and acrylonitrile-butadiene-styrene (ABS) terpolymers. Preferred styrenic copolymers containing elastomeric monomers comprise acrylonitrile-butadiene-styrene (ABS) terpolymers, styrene alkadiene copolymer systems, hydrogenated styrene alkadiene copolymer systems, and the like, with comprise acrylonitrile-butadiene-styrene (ABS) terpolymers being more preferred. The styrenic polymers may comprise a blend of one or more styrenic homopolymers and one or more styrenic copolymers containing one or more elastomeric comonomers. Copolymers may be random or block copolymers. Preferred styrenic copolymers contain elastomeric comonomers in a concentration of about 5 percent by weight or greater and more preferably about 10 percent by weight or greater. Preferred styrenic copolymers contain elastomeric comonomers in a concentration of about 20 percent by weight or less and more preferably about 15 percent by weight or less. Alternatively the styrenic polymers may blended with an elastomeric polymer. Styrenic copolymers may be blended with any elastomeric polymers that form homogeneous blends with the styrenic copolymers and introduce elastomeric properties into the blend. Examples of elastomeric polymers that styrenic polymers may be blended with include styrenic copolymers containing elastomeric comonomers as disclosed hereinbefore, poly(meth)acrylates, poly(meth)acrylonitriles, ethylene-propylene diene rubbers, polyalkdienes, thermoplastic polyurethanes, and the like. Preferred elastomeric polymers include poly(meth)acrylates, poly(meth)acrylonitriles, ethylene-propylene diene rubbers and the like. The styrenic polymers or copolymers used in the concentrate may be any styrenic polymers or copolymers which can disperse long fibers provided the composition contains one or more styrenic copolymers containing one or more unsaturated nitrile compound derived monomer units and one or more elastomeric monomer units. Most preferably the styrenic polymers or copolymers comprise acrylonitrile butadiene styrene terpolymers or acrylonitrile butadiene styrene terpolymers and styrene acrylonitrile copolymers. In moldable compositions useful in the invention the preferred amount of elastomeric monomers or polymers is about 0 percent by weight or greater and most preferably about 4 percent by weight or greater. In thermoplastic compositions useful in the invention the preferred amount of elastomeric monomers or polymers is about 10 percent by weight or less and most preferably about 5 percent by weight or less. The amount of the one or more styrenic copolymers in the concentrate is sufficient to enhance the dispersion of the fibers in the composition reinforced. Preferably the amount of the one, or more styrenic copolymers utilized in the concentrate is about 10 percent by weight or greater based on the weight of the polymers utilized in the concentrate, more preferably about 20 percent by weight or greater and most preferably about 30 percent by weight or greater. Preferably the amount of one or more styrenic copolymers in the polymer composition utilized in the concentrate is about 50 percent by weight or less based on the weight of the polymers utilized in the concentrate, more preferably about 40 percent by weight or less and most preferably about 30 percent by weight or less.

In one embodiment the invention is a concentrate of reinforcing fibers in the thermoplastic compositions. Preferably the concentrates contain long fibers, generally the length of the fibers is based on the length of pellets or structures prepared from the fibers and the thermoplastic polymers. The length is generally the longest dimension. The length is preferably chosen to provide fiber that when incorporated into a final composition provide improved coefficient of linear expansion, modulus, impact, heat resistance and the like. Preferably the fibers have a length of about 3 mm or greater and more preferably about 9 mm or greater. Preferably the fibers have a length of about 30 mm or less and more preferably about 13 mm or less. The fibers may comprise any fibers that when dispersed in a final composition provide improved coefficient of linear expansion, modulus, impact, heat resistance and the like. Exemplary fiber types include polymeric fibers, carbon fibers, glass fibers and the like. More preferred fibers are carbon and glass fibers, with glass fibers being most preferred. Preferably, the concentration of fibers in the concentrate about 30 percent by weight or greater, more preferably about 50 percent by weight or greater and most preferably about 60 percent by weight or greater. The concentration of fibers in the concentrate about 80 percent by weight or less, more preferably about 75 percent by weight or less and most preferably about 70 percent by weight or less.

The concentrate further comprises one or more polyamides so as to enhance the robustness of fiber concentrates and the flow properties of the concentrate. Any polyamide that provides these advantages may be utilized in the concentrates. A polyamide is the reaction product of a diamine and a dicarboxylic acid. The polyamides used in the blends of this invention are well known in the art and embrace semi-crystalline and amorphous resins having a molecular weight of at least 5,000 and commonly referred to as nylons. Suitable polyamides include those described in U.S. Pat. Nos. 2,071,250; 2,071,251; 2,130,523; 2,130,948; 2,241,322; 2,312,966; 2,512,606; 3,393,210; 2,071,250; 2,071,251; 2,130,523; 2,130,948; 2,241,322; 2,312,966; and 2,512,606; all incorporated herein by reference in their entirety. The polyamides may be produced by condensation of equimolar amounts of a saturated dicarboxylic acid containing from 4 to 12 carbon atoms with a diamine, in which the diamine contains from 4 to 14 carbon atoms. Excess diamine can be employed to provide an excess of amine end groups over carboxyl end groups in the polyamide. Examples of polyamides include polyhexamethylene adipamide (66 nylon), polyhexamethylene azelaamide (69 nylon), polyhexamethylene sebacamide (610 nylon), and polyhexamethylene dodecanoamide (612 nylon), the polyamide produced by ring opening of lactams, i.e., polycaprolactam, polylauric lactam, poly-11-amino-undecanoic acid, bis(paraaminocyclohexyl) methane dodecanoamide. It is also possible to use in this invention polyamides prepared by the copolymerization of two of the above polymers or terpolymerization of the above polymers or their components, e.g., an adipic, isophthalic acid hexamethylene diamine copolymer. Preferably, the polyamides are linear with a melting point in excess of 200 degrees C. The term "nylon" as used herein refers to nylon containing conventional compounding ingredients as are known to those skilled in the art. Examples of the polyamide resins are Nylon 4, Nylon 6, Nylon 7, Nylon 8, Nylon 9, Nylon 11, Nylon 12, Nylon 66, Nylon 610, etc. These polyamide resins may be used alone or in combination. The amount of polyamide in the concentrate is sufficient to enhance the robustness of fiber concentrates and the flow properties of the concentrate. Preferably the amount of polyamide in the polymer composition utilized in the concentrate is about 30 percent by weight or greater based on the weight of the polymers utilized in the concentrate, more preferably about 40 percent by weight or greater and most preferably about 50 percent by weight or greater. Preferably the amount of polyamide in the polymer composition utilized in the concentrate is about 90 percent by weight or less based on the weight of the polymers utilized in the concentrate, more preferably about 80 percent by weight or less and most preferably about 70 percent by weight or less.

The composition utilized to disperse the fibers in the concentrate may further comprise one or more polymers or copolymers that compatibilize compositions containing styrenic polymers or copolymers and polyamides. Any polymers or copolymers that compatibilize compositions containing styrenic polymers or copolymers and polyamides may be utilized. Exemplary compatibilizers include styrene-maleic imide copolymers, styrenic polymers or copolymers having maleic anhydride grafted to the backbone, (for example maleic anhydride grafted acrylonitrile-butadiene-styrene (ABS)), acrylamide grafted acrylonitrile-butadiene-styrene (ABS), ethylene-styrene-glycidyl methacrylate graft copolymers, preferred compatibilizers include styrene-maleic imide copolymers and the like. Compatibilizers are utilized in a sufficient amount to render the blend of the thermoplastic composition containing styrenic polymers or copolymers and one or more polyamides homogeneous.

Preferably the amount of the compatibilizer is about 0.5 percent by weight or greater based on the polymeric matrix the fibers are dispersed in, more preferably about 1 percent by weight or greater. Preferably the amount of the compatibilizer is about 10 percent by weight or less based on the polymeric matrix the fibers are dispersed in, more preferably about 5 percent by weight or less.

The concentrates may further comprise an impact modifier. Any impact modifier that improves the impact properties of molded products prepared from the concentrates and which forms a homogeneous mixture with polyamides may be utilized. Preferred impact modifiers include elastomeric polyolefins and modified polyolefins. Elastomeric polyolefin include propylene-ethylene copolymers available under the trademark VERSIFY™ plastomers and elastomers, polyolefin elastomers available under the trademark AFFINITY and AFFINITY GA™ polyolefin elastomers and ENGAGE™ polyolefin elastomers, olefin block copolymers available under the trademark INFUSE™ olefin block copolymers. Preferred modified polyolefins include copolymers of olefins with unsaturated acids, anhydrides or imides or polyolefins with unsaturated acids, anhydrides or imides grafted to the polyolefin backbone. Preferred polyolefins include polyethylenes and polypropylenes with polyethylenes preferred. Examples of modified polyolefins useful are ethylene acrylic acid copolymers, available from Dow Chemical Midland Mich. under the Trademark PRIMACOR resins and polyethylenes grafted with maleic anhydride available under the trademark AMPLIFY functional polymers. The impact modifiers are present in an amount sufficient to improve the impact properties of the molded compositions of the invention. The impact modifiers may be present in an amount of about 1 percent by weight or greater of the concentrate, preferably about 5 percent by weight or greater and most preferably about 10 percent by weight or greater. The impact modifiers may be present in an amount of about 20 percent by weight or less of the concentrate and most preferably about 15 percent by weight or less.

The concentrates comprise the fibers dispersed in the polymeric matrix described herein. The amount of polymeric composition in the concentrate is chosen to facilitate the blending of the fibers into a final composition used to make the desired product. Generally the concentrate is used to incorporate the fibers into a moldable composition to enhance the CLTE and modulus of the moldable composition. It is desired to utilize the lowest amount possible of the polymeric matrix in the concentrate to provide the greatest flexibility in incorporation of the fibers into the final moldable composition utilized to make a final product. Preferably the polymer composition utilized to disperse the fibers is about 20 percent by weight or greater of the concentrate and most preferably about 30 percent by weight or greater. Preferably the polymer matrix utilized to disperse the fibers is about 70 percent by weight or less of the concentrate and most preferably about 60 percent by weight or less. Preferably the concentration of fibers in the concentrate is about 30 percent by weight or greater of the concentrate more preferably 40 percent by weight or greater. Preferably the concentration of fibers in the concentrate is about 80 percent by weight or less of the concentrate more preferably 70 percent by weight or less. The fibers may have a sizing coated on the surface of the fibers. The sizing is adapted to improve the adhesion of the fibers to the thermoplastic composition in the coating. Any sizing that enhances bonding of the thermoplastic composition to the fibers may be utilized.

In a preferred embodiment the concentrates are utilized in the form of pellets and the pellets have the fibers oriented in the same direction. Preferably the fibers extend the entire length of the pellets. The concentrates are adapted to be blended with thermoplastic compositions to disperse the fibers in the thermoplastic compositions. The concentrates may be used with any polymers in which the concentrates described herein can disperse the fibers for example, styrenic polymers or copolymers, terephthalates (polyethylene or polybutylene terphthalates), polyesters, polycarbonates, polyamides, and the like or blends thereof. The thermoplastic compositions preferably comprise styrenic polymers or copolymers as described hereinbefore. Preferably the thermoplastic compositions contain styrenic copolymers containing elastomeric monomers or styrenic polymers or copolymers blended with elastomeric polymers or copolymers. The thermoplastic composition containing styrenic polymers or copolymers may be further blended with other polymers for example terephthalates (polyethylene or polybutylene terephthalates), polyesters, polycarbonates, polyamides and the like. In some embodiments the concentrate can be blended with a mineral filled polymer composition. Preferably the thermoplastic compositions comprise one or more of styrene acrylonitrile and acrylonitrile-butadiene-styrene.

In a preferred embodiment the concentrates are blended with high melt flow rate thermoplastic polymers, more preferably the high melt flow rate thermoplastic polymers comprise copolymers of one or more styrenic monomers with one or more elastomeric monomers. Preferably the high melt flow rate copolymers exhibit a melt flow rate of about 5 or greater, more preferably 10 or greater, even more preferably about 20 or greater and most preferably about 50 or greater. Preferably the melt flow rate is less than about 200 or greater. Melt flow rate is preferably determined according to the test method ISO 1133 measured at 220° C. and 10 Kg, and the result is quoted in units of grams/10 minutes.

The concentrates are blended with thermoplastic polymer compositions to provide the desired fiber concentration. The desired fiber concentration is chosen to provide selected target properties and is application dependent. The particular weight ratio of concentrates and thermoplastic polymers is based on the desired fiber level in the ultimate product and the concentration in the concentrate. Generally the fiber concentration may be about 60 percent by weight or less of fibers in the resulting composition, more preferably about 50 percent by weight or less and most preferably about 40 percent by weight or less. Generally the fiber concentration may be about 10 percent by weight or greater of fibers in the resulting composition, more preferably about 20 percent by weight or greater and most preferably about 30 percent by weight or greater. The final compositions may contain other ingredients commonly utilized in thermoplastic compositions, for instance colorants, de-molding agents, anti-oxidants, UV stabilizers, heat stabilizers, fillers, shelf stabilizers, slip agents, flame retardants, and the like. The concentrates may be prepared by any known process for forming concentrates containing fibers, especially long glass fibers. A preferred process for preparing the concentrates of the invention involves passing the fibers, preferably in the form of fiber bundles or mats, through a bath containing the polymer composition used to disperse the fibers under conditions such that the fibers are dispersed in the polymer mixture. In essence the polymer mixture impregnates the fibers. The polymers can be dispersed in a carrier or can be molten such that the fibers can pass through the bath and become impregnated with the polymer. The temperature of the bath is selected such that the polymers are in molten form, where the fibers are passed through a molten bath. After the polymer solidifies and impregnates the fibers, the impregnated fibers are cut to the desired length. In a preferred embodiment the fibers are in a bundle (rovings) and the impregnated bundle is cut in the direction transverse to the fiber direction to prepare pellets. In some embodiments the impregnated fibers are passed through a die to shape the impregnated fibers in the direction transverse to the direction of the movement of the fibers. Preferably, the fibers are shaped before the polymer matrix solidifies. Preferably the pellets are of a relatively uniform size.

The concentrates of the invention are blended with one or more thermoplastic polymers, dilution polymers, to prepare a mixture having the desired fiber content. Preferably the concentrate and the thermoplastic polymers are contacted in the molten state with mixing sufficient to evenly disperse the fibers in the molten polymers. The temperature at which the concentrate and the thermoplastic polymers can be contacted is selected such that the polymers present are in the molten state and can be mixed. For styrenic polymers or copolymers, the temperature is preferably about 220° C. or greater, more preferably about 240° C. or greater and most preferably about 260° C. or greater. For styrenic polymers or copolymers, the temperature is preferably about 300° C. or less, more preferably about 290° C. or less and most preferably about 280° C. or less. Any form of mixing which forms a substantially homogeneous mixture of polymers and fibers may be utilized, for example a mixer, a properly equipped extruder, injection molding machine, and the like. A preferred mixing apparatus is a twin screw extruder with heating zones capable of heating the concentrates and thermoplastic polymers to melt them, to render them molten. After mixing, the resulting mixture is preferably cooled and formed into a form which allows the mixture to be used to form desired shapes, for instance pellets. Preferably the pellets comprise fibers homogeneously distributed through the thermoplastic polymer mixture.

Preferably the moldable compositions comprise a sufficient amount of polyamide to provide the desired pellet robustness and pellet flow properties. The concentration of polyamide in the mixture can be any concentration that facilitates preparation of the desired final products. Preferably the polyamide concentration in the final thermoplastic polymer composition (moldable composition) is about 4 percent by weight or greater based on the polymer mixture including the fibers, more preferably about 10 percent by weight or greater, and most preferably about 15 percent by weight or greater. Preferably the polyamide concentration in the final thermoplastic polymer composition is about 50 percent by weight or less based on the polymer mixture including the fibers, more preferably about 30 percent by weight or less and most preferably about 20 percent by weight or less. The concentration of fibers in the mixture can be any concentration that facilitates preparation of the desired final products. The concentration of fibers in the moldable composition is chosen to provide the desired heat distortion, modulus and impact properties. Preferably the fiber concentration in the final thermoplastic polymer composition (moldable composition) is about 20 percent by weight or greater based on the polymer mixture including the fibers, more preferably about 30 percent by weight or greater, and most preferably about 40 percent by weight or greater. Preferably the polyamide concentration in the final thermoplastic polymer composition is about 70 percent by weight or less based on the polymer mixture including the fibers, even more preferably about 60 percent by weight or less and most preferably about 50 percent by weight or less. To enhance the impact resistance, modulus and flow properties of the resulting mixture it is desirable to control the amount of elastomeric material (rubber) in the mixture. The amount of elastomeric material (rubber) is selected to introduce desired elasticity, modulus and impact resistance and flow properties into the polymer mixture prepared. Flow properties refer to the ability to transport the formed polymer mixture for use in forming desired products. Preferably the concentration of the elastomeric material (rubber) in the final thermoplastic polymer composition (moldable composition) is about 0.1 percent by weight or greater based on the weight of the mixture, more preferably about 1 percent by weight or greater and most preferably about 2 percent by weight of greater. Preferably the concentration of the elastomeric material (rubber) in the final thermoplastic polymer composition (moldable composition) is about 10 percent by weight or less based on the weight of the mixture, more preferably about 5 percent by weight or less and most preferably about 4 percent by weight of less. To enhance the impact resistance, modulus and flow properties of the resulting mixture it is desirable to control the amount of compatibilizer in the mixture. The amount of compatibilizer is selected to enhance the impact resistance and strength properties of the polymer mixture prepared. Preferably the concentration of the compatibilizer in the final thermoplastic polymer composition (moldable composition) is about 0 percent by weight or greater based on the weight of the mixture, more preferably about 0.1 percent by weight or greater and most preferably about 0.3 percent by weight of greater. Preferably the concentration of the compatibilizer in the final thermoplastic polymer composition (moldable composition) is about 5 percent by weight or less based on the weight of the mixture, more preferably about 2 percent by weight or less and most preferably about 1 percent by weight of less.

The resulting mixtures of the concentrate and thermoplastic polymers can be formed into desired products using known molding processes such as injection molding, compression molding, thermoforming, and the like. In one preferred embodiment the concentrates and thermoplastic polymers may be mixed and then immediately formed into a final part. Preferably the concentrates and thermoplastic polymers are mixed in a single screw extruder and then extruded into a desired shape or introduced into a mold, such as an injection mold, to form the desired shape. The mixture is preferably in the molten state when extruded or introduced into a mold. The mixtures of the invention can be used to prepare a variety of parts as described hereinbefore.

The resulting formed products have enhanced properties such as a better retention of modulus at elevated temperatures, such as 90° C. The target properties discussed hereinafter are based on moldable compositions as exemplified in this application having a long glass fiber composition of 35 percent by weight. Preferably the products exhibit a tensile modulus of about 9,000 N/M$^2$ or greater according to test method ISO 527, more preferably about 10,000 N/M$^2$ or greater and most preferably about 11,000 N/M$^2$ or greater. Preferably the products exhibit a tensile yield of about 105 or greater according to test method ISO 527. The molded compositions of the invention demonstrate a Charpy impact of about 22 kj/M$^2$ or greater and more preferably about 30 kj/M$^2$ or greater according to test method ISO 179-1Ea. Preferably the moldable compositions exhibit enhanced processing properties as demonstrated by having a spiral flow rate of about 60 or greater and more preferably about 70 or greater as determined by test method ISO 22088-3. The resulting products exhibit less sensitivity to water absorbtion. Molded compositions of the invention exhibit an increase in weight after boiling in water for 1 hour of 1 percent of less and a drop in modulus after such exposure of 10 percent or less. The parts further exhibit enhanced chemical resistance, lower coefficient of linear expansion, and low gloss.

One or more as used herein means that at least one, or more than one, of the recited components may be used as disclosed.

Illustrative Embodiments of the Invention

The following examples are provided to illustrate the invention, but are not intended to limit the scope thereof. All parts and percentages are by weight unless otherwise indicated.

A fiber bundle comprising continuous fibers having a diameter of about 5 to 20 micron are passed through a molten bath of the ingredients listed in Table 1 and pelletized to form glass concentrates of 50 to 60 percent by weight. The concentrates are in the form of pellets with fibers of the length of 11 mm.

TABLE 2

|  | EX 0 | EX 1 | EX 2 | EX 3 | EX 4 |
|---|---|---|---|---|---|
| coffee mill 10s. (cm) | >100 | 60 | 45 | 30 | 32 |

The concentrates of Example 0 to Example 4 are blended with styrenic polymers and test specimens are prepared. The concentrates are diluted to 35 percent glass with acrylonitrile-butadiene-styrene (ABS) or styrene acrylonitrile (SAN). The test specimens are tested for Charpy Impact using test method ISO 179-1eA, Tensile Modulus and tensile yield using test method ISO 527, HDT 1.8 MPa unannealed using test method ISO 75/A. The spiral flow test is performed where the material is injected at 260° C. melt in a 60° C. tool at a 1800 MPa injection pressure in a 2 mm thick cavity. Chemical resistance is determined using test method ISO 22088-3. The rating Poor means a visual impact on the surface quality and OK means no visual impact on surface quality. The results are compiled in Table 3.

TABLE 3

| CONCENTRATE | EX 0 | EX 1 | EX 2 | | | | EX 3 | EX 4 |
|---|---|---|---|---|---|---|---|---|
| DILUTION POLYMER | ABS 6.5 MFR | ABS 6.5 MFR | ABS 5 MFR | ABS 28 MFR | SAN 69 MFR | SAN 100 MFR | ABS 28 MFR | ABS 28 MFR |
| DILUTION RATIO | 1:2.3 | 1:2.3 | | 1:1.4 | | | 1:1.4 | 1:2.3 |
| n. Charpy impact kJ/m2 | 23 | 24 | 22 | 24 | 30 | 33 | 27 | 24 |
| Tensile modulus N/mm$^2$ | 9668 | 10310 | 9195 | 10334 | 11445 | 11300 | 10096 | 10918 |
| Tensile yield N/mm | 81 | 102 | 114 | 132 | 115 | 113 | 131 | 139 |
| HDT 1.8 MPa ° C. | 105 | 117 | 108 | 107 | 109 | 109 | 108 | 150 |
| spiral flow cm | 56 | 58 | 52 | 65 | 70 | 75 | 61 | 80 |
| ESCR (gasoline) | poor | | | OK | OK | | | OK |
| % PA | 0 | 10 | 17.5 | 17.5 | 17.5 | 17.5 | 17.5 | 26 |
| % PB (rubber) | 5.4 | 5.4 | 6.2 | 3.3 | 0.4 | 0.4 | 3.2 | 2.6 |
| % Compatibiliser | 0 | 0 | 0.5 | 0.5 | 0.5 | 0.5 | 0.4 | 0.4 |

TABLE 1

|  | EX 0 | EX 1 | EX 2 | EX 3 | EX 4 |
|---|---|---|---|---|---|
| ABS 28 MFR | 74.6 | 69.4 | 20.8 | 9.5 | 20.6 |
| SAN 100 MFR | 24 | | | | |
| PA6 | | 28.6 | 75 | 75 | 76 |
| AO | 1.4 | 2 | 2.5 | 2.5 | 2 |
| IM | | | | 11.3 | |
| SMI | | | 1.7 | 1.7 | 1.4 |
| glass lvl in cc | 50 | 50 | 60 | 60 | 50 |

ABS is acrylonitrile-butadiene-styrene terpolymers. SAN is a styrene acrylonitrile copolymer. AO is an antioxidant, in particular IRGANOX™ 12076 antioxidant. IM is a functionalized polyethylene based impact modifier, maleic anhydride grafted polyethylene. SMI is styrene maleic imide copolymer. PA6 is polyimide 6 commonly referred to as Nylon 6. The formed pellets are blended in a coffee mill for 10 seconds and after the test the blended pellets exhibit a volume expressed in mm before and after the test. The resulting volumes after the mill test are compiled in Table 2. The enhanced pellet robustness is shown for the examples containing >25% PA in the melt bath. The addition of a functionalized polyethylene known as impact modifier for PA also shows a positive effect on the pellet robustness.

The results in table 3 show that the targeted high flow and stiffness is obtained with lowest rubber content in the styrenics phase. For enhanced yield strength performance an optimal rubber level is found to be from about 2 to about 5 percent in the final blend. The results also show the improvement in yield strength and HDT (heat distortion temperature) for the composition containing 10% PA. A further increase is shown for the compositions 17.5% PA and up to 0.5% compatibiliser. A further increase in PA content to 26% will provide a further steep increase in heat resistance of the final blend. The influence of the presence of the compatibiliser itself is demonstrated with the 3 concentrates listed in table 4.

TABLE 4

|  | EX 5 | EX 6 | EX 7 |
|---|---|---|---|
| ABS 28 MFR | 28.8 | 26.3 | 23.8 |
| PA6 | 70 | 70 | 70 |
| AO | 1.2 | 1.2 | 1.2 |
| SMI | 0 | 2.5 | 5 |
| glass level in cc | 60 | 60 | 60 |
| coffee mill test (ml) | 34 | 40 | 40 |

The results after dilution in SAN are shown in table 5. It is shown that the presence of the compatibiliser up to 1% provides a significant improvement of the yield strength.

TABLE 5

| CONCENTRATE | | EX 5 | EX 6 | EX 7 |
|---|---|---|---|---|
| DILUTION POLYMER | | | SAN 69 MFR | |
| DILUTION RATIO | | | 1-1.4 | |
| n. Charpy Impact | kJ/sq_m | 30 | 34 | 33 |
| Tensile Modulus | N/mm$^2$ | 10829 | 10767 | 10475 |
| Rupture Stress | N/mm$^2$ | 89 | 114 | 116 |
| HDT 1.8 MPa | ° C. | 112 | 110 | 108 |
| spiral flow | cm | 75.5 | 69.0 | 66.5 |
| % PA | | 16.2 | 16.2 | 16.2 |
| % PB | | 0.5 | 0.5 | 0.5 |
| % Compatibiliser | | 0 | 0.6 | 1.2 |

Parts by weight as used herein refers to 100 parts by weight of the composition specifically referred to. Any numerical values recited in the above application include all values from the lower value to the upper value in increments of one unit provided that there is a separation of at least 2 units between any lower value and any higher value. As an example, if it is stated that the amount of a component or a value of a process variable such as, for example, temperature, pressure, time and the like is, for example, from 1 to 90, preferably from 20 to 80, more preferably from 30 to 70, it is intended that values such as 15 to 85, 22 to 68, 43 to 51, 30 to 32 etc. are expressly enumerated in this specification. For values which are less than one, one unit is considered to be 0.0001, 0.001, 0.01 or 0.1 as appropriate. These are only examples of what is specifically intended and all possible combinations of numerical values between the lowest value, and the highest value enumerated are to be considered to be expressly stated in this application in a similar manner. Unless otherwise stated, all ranges include both endpoints and all numbers between the endpoints. The use of "about" or "approximately" in connection with a range applies to both ends of the range. Thus, "about 20 to 30" is intended to cover "about 20 to about 30", inclusive of at least the specified endpoints. The term "consisting essentially of" to describe a combination shall include the elements, ingredients, components or steps identified, and such other elements ingredients, components or steps that do not materially affect the basic and novel characteristics of the combination. The use of the terms "comprising" or "including" to describe combinations of elements, ingredients, components or steps herein also contemplates embodiments that consist essentially of the elements, ingredients, components or steps. Plural elements, ingredients, components or steps can be provided by a single integrated element, ingredient, component or step. Alternatively, a single integrated element, ingredient, component or step might be divided into separate plural elements, ingredients, components or steps. The disclosure of "a" or "one" to describe an element, ingredient, component or step is not intended to foreclose additional elements, ingredients, components or steps.

What is claimed is:

1. A composition comprising:
50 to 80 percent by weight of the composition of long fibers having a length of 9 to 30 mm dispersed in a 20 to 50 percent by weight of the composition of a polymeric matrix comprising 10 to 50 percent by weight based on the polymer matrix of one or more styrenic copolymers containing one or more unsaturated nitrile compound derived monomer units and one or more elastomeric monomer units and 30 to 90 percent by weight based on the polymer matrix of one or more polyamides, wherein the one or more styrenic copolymers exhibit a melt flow rate of about 6 or greater that is determined according to the test method ISO 1133 measured at 220° C. and 10 kg, and wherein the composition further comprises a thermoplastic polymer comprising one or more styrenic monomers with one or more elastomeric monomers with the thermoplastic polymer having a melt flow rate of greater than 10.

2. The composition according to claim 1, wherein the one or more styrenic copolymers contains 5 to less than 20 percent by weight of the one or more elastomeric monomer units.

3. The composition of claim 2, wherein the one or more styrenic copolymers contains 5 to less than 15 percent by weight of one or more elastomeric monomer units.

4. The composition according to claim 1, wherein the long fibers comprise glass or carbon fibers.

5. The composition according to claim 1, wherein the polymer matrix comprises 50 to 80 percent by weight of the one or more polyamides.

6. The composition according to claim 1, wherein the polymeric matrix further comprises from 0.5 to less than 5.0 percent by weight of the polymeric matrix of one or more compatibilizer polymers or copolymers that compatibilize the one or more styrenic copolymers and the one or more polyamides.

7. The composition of claim 6, wherein the one or more compatibilizer polymers or copolymers is styrenic polymers or copolymers having maleic anhydride grafted to the backbone, acrylamide grafted acrylonitrile-butadiene-styrene copolymers, ethylene-styrene-glycidyl methacrylate graft copolymers or combinations thereof.

8. The composition according to claim 1, wherein the polymeric matrix further comprises from 1.0 to 20 percent by weight of the polymeric matrix of an impact modifier, the impact modifier homogeneously mixed with the one or more polyamides.

9. The composition according to claim 8, wherein the impact modifier comprises a modified polyolefin.

10. The composition according to claim 1 comprising 20 to 40 percent by weight of the composition of the polymeric matrix comprising 20 to 40 percent by weight based on the polymer matrix of the one or more styrenic copolymers containing one or more unsaturated nitrile compound derived monomer units and one or more elastomeric monomer units, 40 to 70 percent by weight based on the polymer matrix of the one or more polyamides and from 5.0 to 15 percent by weight of the polymeric matrix of an impact modifier.

11. The composition of claim 1, wherein the length of the long fibers is 9 to 13 mm.

12. The composition of claim 1, wherein the length of the long fibers is greater than 9 mm to 30 mm.

13. The composition of claim 1, wherein the composition is in the shape of a pellet and the long fibers extend the entire length of the pellet.

14. A composition comprising 50 to 80 percent by weight of the composition of long fibers having a length of 3 to 30 mm dispersed in a 20 to 50 percent by weight of the composition of a polymeric matrix comprising 10 to 50 percent by weight based on the polymer matrix of one or more styrenic copolymers containing one or more unsaturated nitrile compound derived monomer units and one or more elastomeric monomer units and 30 to 90 percent by weight based on the polymer matrix of one or more polyamides, wherein the one or more styrenic copolymers exhibit a melt flow rate of about 6 or greater that is determined according to the test method ISO 1133 measured at 220° C. and 10 kg, wherein the one or more styrenic copolymers is comprised of the one or more elastomeric monomer units in an amount from 2% to less than 20% by weight, and wherein the composition further comprises a thermoplastic polymer comprising one or more styrenic monomers with one or more elastomeric monomers with the thermoplastic polymer having a melt flow rate of greater than 10.

15. The composition of claim 14, wherein the amount of the one or more elastomeric monomer units in the one or more styrenic copolymers is 15% by weight or less.

16. The composition of claim 14, wherein the long fibers have a diameter of 5 to 20 micrometers.

17. The composition of claim 14, wherein the long fibers have a diameter of 5 to 20 micrometers.

18. The composition of claim 17, further comprising a compatibilizer polymer or copolymer, wherein the compatibilizer polymer or copolymer is styrenic polymers or copolymers having maleic anhydride grafted to the backbone, acrylamide grafted acrylonitrile-butadiene-styrene copolymers, ethylene-styrene-glycidyl methacrylate graft copolymers or combinations thereof.

19. The composition of claim 14, wherein the length of the long fibers is 9 to 30 mm.

20. The composition of claim 14, wherein the composition is in the shape of a pellet and the long fibers extend the entire length of the pellet.

* * * * *